(12) United States Patent
Yoon et al.

(10) Patent No.: US 9,467,204 B2
(45) Date of Patent: Oct. 11, 2016

(54) VOLTAGE REGULATOR WITH CURRENT MIRRORING CIRCUITRY FOR TRANSMITTERS FOR NEAR FIELD COMMUNICATION (NFC) DEVICES AND CHIPS, AND ELECTRONIC DEVICES INCLUDING SUCH NFC CHIPS

(71) Applicant: Samsung Electronics Co., Ltd., Suwon-si, Gyeonggi-do (KR)

(72) Inventors: Chol Su Yoon, Yongin-si (KR); Il Jong Song, Suwon-si (KR); Jae Hun Choi, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/524,149

(22) Filed: Oct. 27, 2014

(65) Prior Publication Data

US 2015/0118963 A1    Apr. 30, 2015

(30) Foreign Application Priority Data

Oct. 31, 2013    (KR) ......................... 10-2013-0131606

(51) Int. Cl.
*H04B 5/00*    (2006.01)

(52) U.S. Cl.
CPC ................................. *H04B 5/0031* (2013.01)

(58) Field of Classification Search
None
See application file for complete search history.

(56) References Cited

U.S. PATENT DOCUMENTS

| 7,106,033 | B1* | 9/2006 | Liu ......................... G05F 1/575 |
| | | | 323/280 |
| 2009/0011706 | A1* | 1/2009 | Wilson ..................... H04B 5/02 |
| | | | 455/41.1 |
| 2012/0040610 | A1 | 2/2012 | Moosavi et al. |
| 2015/0069951 | A1* | 3/2015 | Wang .................... H02J 7/0052 |
| | | | 320/107 |

FOREIGN PATENT DOCUMENTS

| JP | 11-338983 | 12/1999 |
| JP | 2003-124822 | 4/2003 |
| JP | 2005-107781 | 4/2005 |
| JP | 2010-109699 | 5/2010 |
| JP | 2011-232927 | 11/2011 |
| KR | 101235087 B1 | 2/2013 |

* cited by examiner

*Primary Examiner* — Alejandro Rivero
(74) *Attorney, Agent, or Firm* — Myers Bigel & Sibley, P.A.

(57) ABSTRACT

A transmitter of a NFC device includes a current detector which detects a first current flowing in an output node of a regulator and outputs a current detection signal related to a result of the detection, and a control block which compares the current detection signal with a reference current and generates a control signal for controlling a voltage of the output node according to a result of the comparison.

15 Claims, 6 Drawing Sheets

VOLTAGE REGULATOR WITH CURRENT MIRRORING CIRCUITRY FOR TRANSMITTERS FOR NEAR FIELD COMMUNICATION (NFC) DEVICES AND CHIPS, AND ELECTRONIC DEVICES INCLUDING SUCH NFC CHIPS

CROSS-REFERENCE TO RELATED APPLICATION

This application claims priority under 35 U.S.C. §119(a) to Korean Patent Application No. 10-2013-0131606 filed on Oct. 31, 2013, the disclosure of which is hereby incorporated by reference in its entirety herein.

BACKGROUND

Embodiments of the present inventive concept relate to near field communication (NFC) devices, and more particularly to transmitters for NFC devices and chips, and to electronic devices having such NFC chips.

Near field communication (NFC) refers to a short range, bi-directional wireless communication technology which may be used to transmit data between terminals that are within 10 cm of each other in a 13.56 MHz frequency band. Near field wireless communication may be performed between, for example, an NFC device and a smart card. The transmitter of the NFC device generates a radio frequency (RF) field, and transmits power and data to another NFC device such as the smart card through the RF field.

The transmitter of an NFC device may use a low-dropout voltage regulator. The low-dropout voltage regulator may lower an input voltage within a fixed range to generate an output voltage that is lower than the input voltage. Generally, the transmitter of the NFC device supplies a fixed maximum output to an antenna using a fixed output voltage.

SUMMARY

Some embodiments of the present inventive concepts are directed to transmitters for NFC devices that include a current detector that is configured to detect a first current that flows into an output node of a regulator and to output a current detection signal that is proportional to the detected first current; and a control block which is configured to compare the current detection signal to a reference current and to control a voltage of the output node based on a result of the comparison.

The regulator may include a comparator that is configured to compare a reference voltage to a feedback voltage and to output a comparison signal, a first current generator which is configured to generate the first current in response to the comparison signal, a feedback voltage generator which is configured to generate the feedback voltage based on the first current, and a voltage control block which is configured to control a voltage of the output node in response to a control signal that is received from the control block.

The current detector may include a second current generator which is configured to generate a second current by mirroring the first current. The control block may receive the current detection signal, which may be related to the second current. The first current generator may be a first MOS transistor and the second current generator may be a second MOS transistor, and the first and second MOS transistors may have substantially the same characteristics.

The transmitter of the NFC device may further include an antenna driver which controls an output voltage output to an antenna in response to the control signal.

An embodiment of the present inventive concepts is directed to a NFC chip, including the transmitter of the NFC device which drives an antenna, and a controller which controls an operation of the transmitter of the NFC device.

The regulator may include a comparator that is configured to compare a reference voltage with a feedback voltage and to output a comparison signal, a first current generator which is configured to generate the first current in response to the comparison signal, a feedback voltage generator which is configured to generate the feedback voltage based on the first current, and a voltage control block which is configured to control a voltage of the output node in response to a control signal that is received from the control block.

The current detector may include a second current generator which is configured to generate a second current by mirroring the first current. The control block may receive the current detection signal, which may be related to the second current.

Another embodiment of the present inventive concepts is directed to a portable electronic device that includes an NFC chip which includes a transmitter that is configured to drive an antenna, a controller that is configured to control operation of the transmitter, and an application processor which is configured to control the operation of the NFC chip. The transmitter may include a current detector which is configured to detect a first current that flows into an output node of a regulator and to output a current detection signal in response to the detected first current, and a control block which is configured to compare the current detection signal to a reference current and to generate a control signal for controlling a voltage of the output node based on a result of the comparison.

The regulator may include a comparator which is configured to compare a reference voltage with a feedback voltage and outputs a comparison signal, a first current generator which is configured to generate the first current in response to the comparison signal, a feedback voltage generator which is configured to generate the feedback voltage based on the first current, and a voltage control block which is configured to control a voltage of the output node in response to the control signal.

The current detector may include a second current generator which is configured to generate a second current by mirroring the first current. The current detection signal may be related to the second current, and the control block may receive the current detection signal. The NFC chip may further include an antenna driver which is configured to control an output voltage that is output to the antenna in response to the control signal.

Another embodiment of the inventive concepts is directed to a transmitter for a near field communication device that includes a regulator that is configured to deliver an output current to an output node; a mirror circuit that is configured to generate a current detection signal having a known relationship to the output current; and a control circuit that is configured to control a voltage of the output node and to control a voltage that is output to an antenna based on the current detection signal.

The control circuit may be configured to generate a control signal that controls both a voltage control block that sets a voltage of the output node and an antenna driver that controls a voltage output to the antenna.

The control circuit may be configured to generate the control signal based on a comparison of the current detection signal to a reference current.

The reference current may be based on a value of an externally programmable control register.

The current detection signal may comprise a portion of a mirror current that is generated by the mirror circuit that substantially mirrors the output current of the regulator.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION

The present inventive concepts are described more fully hereinafter with reference to the accompanying drawings, in which embodiments of the inventive concepts are shown. The inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, operations, elements, and/or components, but do not preclude the presence or addition of one or more other features, operations, elements, components, and/or groups thereof.

Unless otherwise defined, all terms (including technical and scientific terms) used herein have the same meaning as commonly understood by one of ordinary skill in the art to which the inventive concepts belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
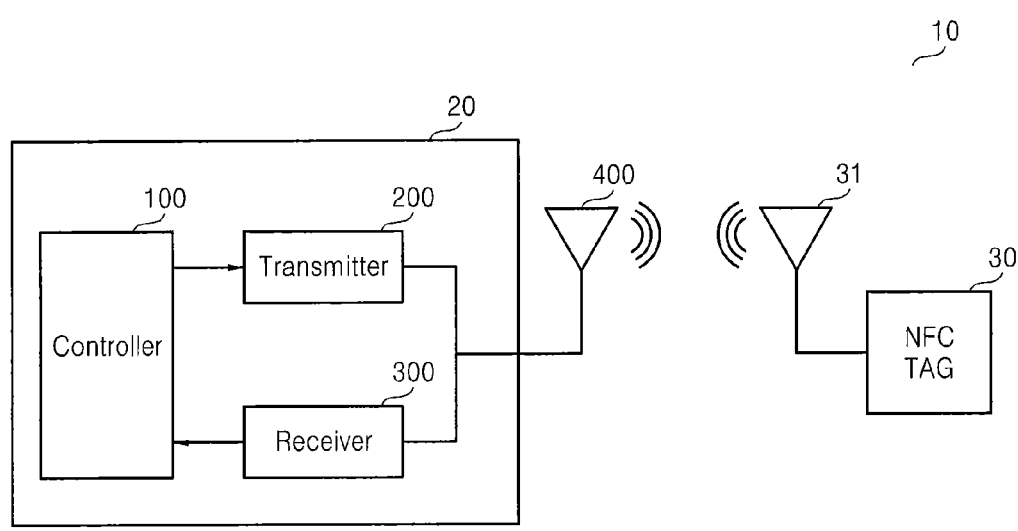
FIG. 1 is a block diagram of a near field wireless communication system which includes a near field wireless communication device according to example embodiments of the present inventive concepts.

FIG. 1 is a block diagram of a near field wireless communication system which includes a near field wireless communication device according to an example embodiment of the present inventive concepts. Referring to FIG. 1, an NFC system 10 which may support near field communications (NFC) includes an NFC device 20 and an NFC tag 30. The NFC tag 30 may be a NFC device which has the same structure as the NFC device 20.

The NFC device 20 may be a NFC chip, and the NFC chip may be installed in an electronic device which may support NFC. The NFC system 10 may be embodied in, for example, a security system, a payment system, a traffic system, a reservation and note issuing system, a building access system, or an electronic equipment access system.

The NFC device 20 and the NFC tag 30 may exchange data via wireless, radio frequency communications. For example, the NFC device 20 and the NFC tag 30 may support the standard of ISO 14443A or ISO 14443B.

The NFC device 20 may be included in, for example, a wireless communication device or a portable electronic device. The portable electronic device may be, for example, a laptop computer, a mobile terminal, a smart phone, a tablet PC, a personal digital assistant (PDA), an enterprise digital assistant (EDA), a digital still camera, a digital video camera, a portable multimedia player (PMP), a personal navigation device, a portable navigation device (PND), a handheld game console, a mobile internet device (MID), or an e-book.

The NFC device 20 includes a controller 100, a transmitter 200, and a receiver 300.

The transmitter 200 may supply an RF signal (or RF power) and data to an antenna 400 to transmit data to the NFC tag 30 under the control of the controller 100.

The NFC tag 30 may receive the RF signal and data that is output from the NFC device 20 through the antenna 400. The RF signal may include the data. For example, the data may be transmitted in the form of the RF signal. The NFC tag 30 may interpret the RF signal output from the NFC device 20, generate data corresponding to a result of the interpretation, and transmit the generated data to the antenna 400 of the NFC device 20 through an antenna 31. The data received at the antenna 400 of the NFC device 20 may be transmitted to the receiver 300 of the NFC device 20 in the form of the RF signal.

Figure 2:
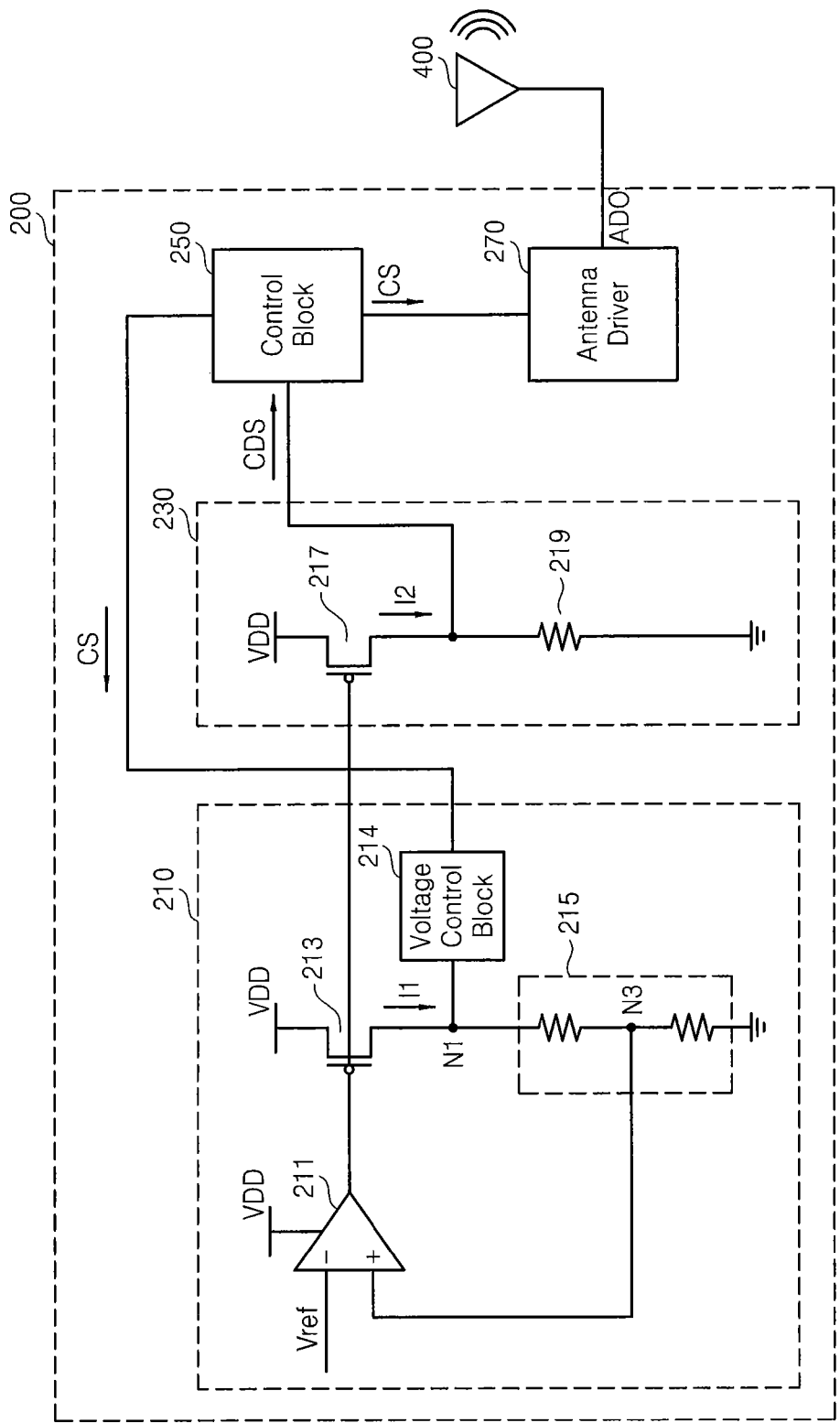
FIG. 2 is a block diagram of a transmitter of the near field wireless communication device illustrated in FIG. 1.

FIG. 2 is a block diagram of an example embodiment of the transmitter 200 that is illustrated in FIG. 1. Referring to FIG. 2, the transmitter 200 may include a regulator 210, a current detector 230, a control block 250, and an antenna driver 270. The antenna driver 270 may be connected to the antenna 400 of FIG. 1.

The regulator 210 may include a comparator 211, a first current generator 213, a feedback voltage generator 215, and a voltage control block 214. The comparator 211 may compare a reference voltage Vref with a feedback voltage that is output from the feedback voltage generator 215, and the comparator 211 may output a comparison signal to the first current generator 213 and to the current detector 230.

The first current generator 213 may generate a first current I1 in response to the comparison signal that is output by the comparator 211. The first current generator 213 may comprise a MOS transistor, for example, a PMOS transistor. The feedback voltage generator 215 may generate a feedback voltage based on the first current I1. In one example embodiment, the feedback voltage generator 215 may include resistances connected in series between the first current generator 213 and a ground voltage.

The voltage control block 214 may control a voltage of an output node N1 in response to a control signal CS that is output by the control block 250. For example, the control signal CS may be a digital signal that includes one or more bits.

The current detector 230 may generate a second current I2 by mirroring the first current I1. Here, the first current I1 and the second current I2 may have the same values or may have different values. The current detector 230 may include a second current generator 217 and a resistance 219 which are connected in series between a power line that receives an operating voltage VDD and ground.

The second current generator 217 may generate the second current I2 in response to the comparison signal that is output by the comparator 211. The first current I1 and the second current I2 may be designed to have substantially identical values or, alternatively, may be designed to have different values.

For example, when the first current generator 213 is implemented as a first PMOS transistor, and the second current generator 217 is implemented as a second PMOS transistor, a relationship between the first current I1 and the second current I2 may be determined based on how a first ratio between the width and the length of a channel of the first PMOS transistor compares to a second ratio between the width and the length of a channel of the second PMOS transistor. Thus, the second current I2 may mirror the first current, but need not have the same value as the first current. In other words, changes in the first current I1 may result in proportional changes to the second current I2 in some embodiments.

The current detector 230 may detect the second current I2, and transmit a current detection signal CDS generated according to a result of the detection, e.g., a detection current, to the control block 250. That is, the current detector 230 may detect a change in the second current I2 which is made by mirroring the first current I1, and transmit the current detection signal CDS corresponding to a result of the detection, e.g., a detection signal, to the control block 250.

The control block 250 may receive the current detection signal CDS that is output from the current detector 230, compare the current detection signal CDS to a reference current, and output the control signal CS to the voltage control block 214 and the antenna driver 270 based on a result of this comparison. The reference current may be set based on the setting of a control register that is included in the control block 250. The control register may be externally programmable.

While in FIG. 2 voltage control block 214 is part of the regulator 210, it will be appreciated that in other embodiments the voltage control block 214 may instead be part of in the control block 250.

The antenna driver 270 may control an output voltage ADO of the antenna driver 270 and supply the controlled output voltage to the antenna 400 in response to the control signal CS that is output from the control block 250. That is, the transmitter 200 may regulate a voltage of an output node N1 of the regulator 210 and/or the output voltage ADO of the antenna driver 270 using the control signal CS that is output from the control block 250.

Figure 3A:
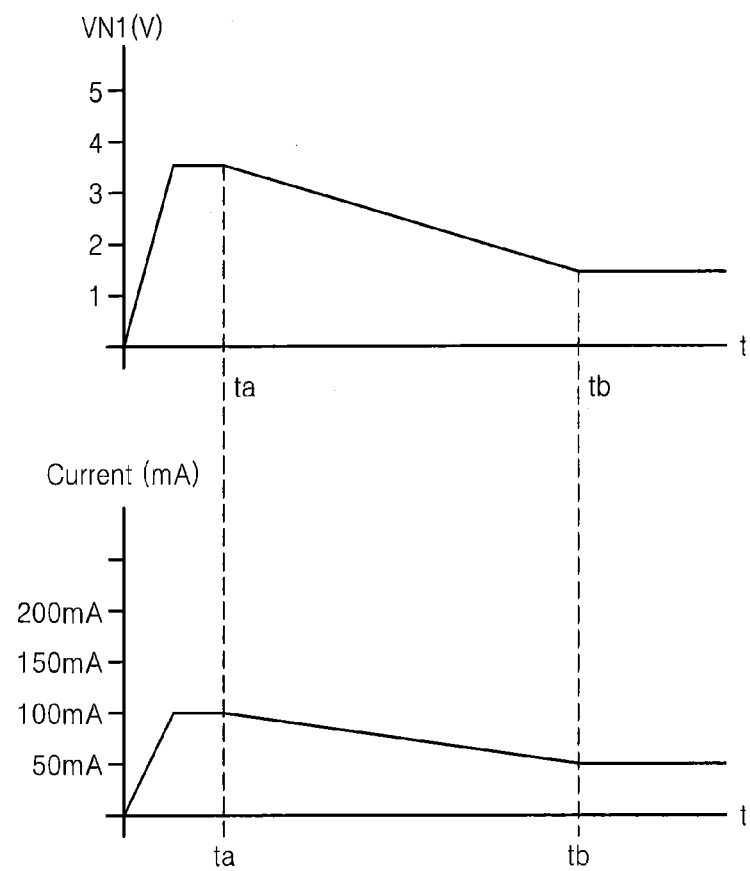
FIGS. 3A and 3B are waveform diagrams depicting a change in voltage and a change in consumed current of an output node of a regulator that is included in the transmitted illustrated in FIG. 1.
Figure 3B:
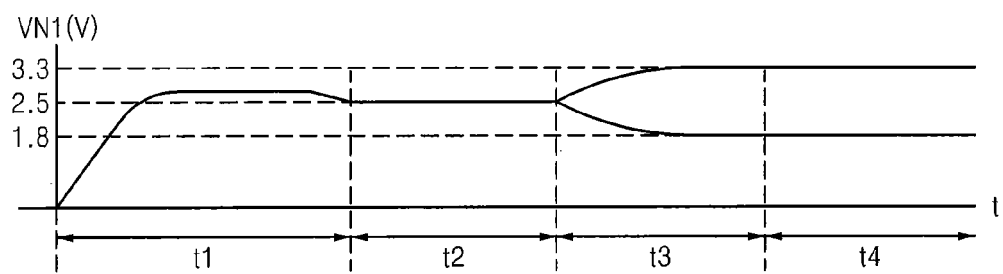

FIGS. 3A and 3B are waveform diagrams showing a change in voltage and a change in consumed current of an output node of the regulator 210 that is illustrated in FIG. 1. As shown in FIG. 3A, at a first time Ta an output voltage VN1 of the output node N1 of the regulator 210 is 3.3 V, and the current that is consumed by the transmitter 200 is 106 mA. At a second time Tb, the output voltage VN1 of the output node N1 is reduced to 1.8 V, and the current that is consumed by the transmitter 200 is reduced to 50.6 mA.

Referring to FIG. 3B, in a first section t1, the output voltage VN1 of the output node N1 may reach a target voltage (which is 2.5 V in this example).

In a second section t2, when the output voltage VN1 of the output node N1 is 2.5 V, the current detector 230 detects the second current I2 which, as discussed above, may be related in a known fashion to the first current I1 that flows into the output node N1.

The control block 250 compares the current detection signal CDS that is generated by the current detector 230 with the reference current, and controls the output voltage VN1 of the regulator 210 and/or the output voltage ADO of the antenna driver 270 using the control signal CS that is generated based on the result of the comparison.

In a third section t3, the output voltage VN1 and/or the output voltage ADO may be controlled to reach a target voltage, e.g., 1.8 V or 3.3 V. In a fourth section t4, the current detector 230 detects the second current I2 that is related to the first current I1 that flows into the output node N1 of the regulator 210, and the control block 250 compares the current detection signal CDS received from the current detector 230 with the reference current, and controls at least one of the output voltage VN1 of the regulator 210 and the output voltage ADO of the antenna driver 270 based on the result of the comparison.

Figure 4:
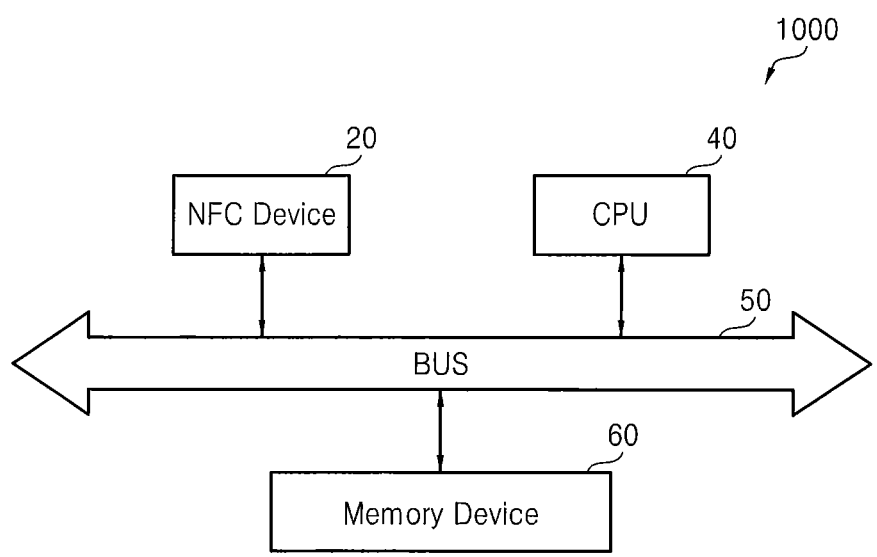
FIG. 4 is a block diagram depicting an example embodiment of a portable electronic device that includes the NFC device illustrated in FIG. 1.

FIG. 4 is a block diagram depicting an example embodiment of a portable electronic device that includes the NFC device illustrated in FIG. 1. For example, the portable electronic device 1000 may be a portable computer including the NFC device 20, a tablet computer, a smart phone, a mobile internet device (MID), or a personal digital assistant (PDA).

The portable electronic device 1000 may include a central processing unit (CPU) 40 that controls the operation of the NFC device 20. The portable electronic device 1000, may also include a memory device 60 which may store data received from the NFC device 20 or data to be transmitted to an external NFC device through the NFC device 20. The memory device 60 may be, for example, a volatile memory device or a non-volatile memory device.

Figure 5:
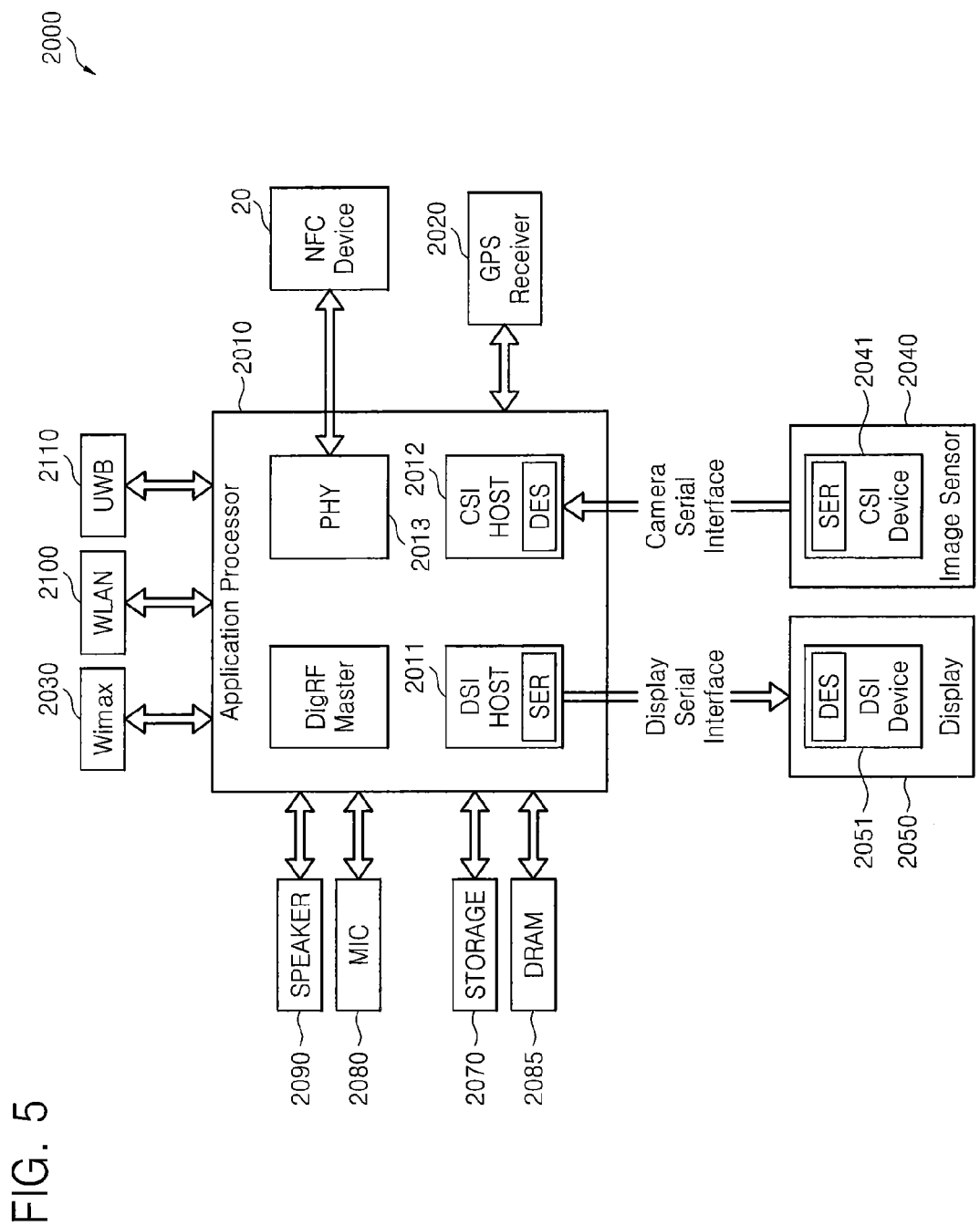
FIG. 5 is a block diagram depicting another example embodiment of a portable electronic device that includes the NFC device illustrated in FIG. 1.

FIG. 5 is a block diagram depicting another example embodiment of the portable electronic device that includes the NFC device illustrated in FIG. 1. Referring to FIG. 5, a portable electronic device 2000 may be embodied in a data processing device which may use or support a MIPI interface, e.g., a smart phone, a tablet PC, or a mobile internet device.

The portable electronic device 2000 includes an application processor AP 2010, an image sensor 2040, and a display 2050.

A CSI host 2012 embodied in the AP 2010 may be in serial communication with a CSI device 2041 of the image sensor 2040 through a camera serial interface (CSI). Here, a de-serializer (DES) may be embodied in the CSI host 2012, and a serializer (SER) may be embodied in the CSI device 2041.

A DSI host 2011 embodied in the AP 2010 may be in serial communication with a DSI device 2051 of the display 2050 through a display serial interface (DSI). For example, the serializer (SER) may be embodied in the DSI host 2011, and the de-serializer (DES) may be embodied in the DSI device 2051.

The portable electronic device 2000 may include the NFC device 20 which may communicate with the AP 2010. The portable electronic device 2000 may further include a GPS receiver 2020, a storage 2070, a microphone 2080, a DRAM 2085, and a speaker 2090. The portable electronic device 2000 may communicate with another portable electronic device using Wimax 2030, WLAN 2100, and UWB 2110.

Figure 6:
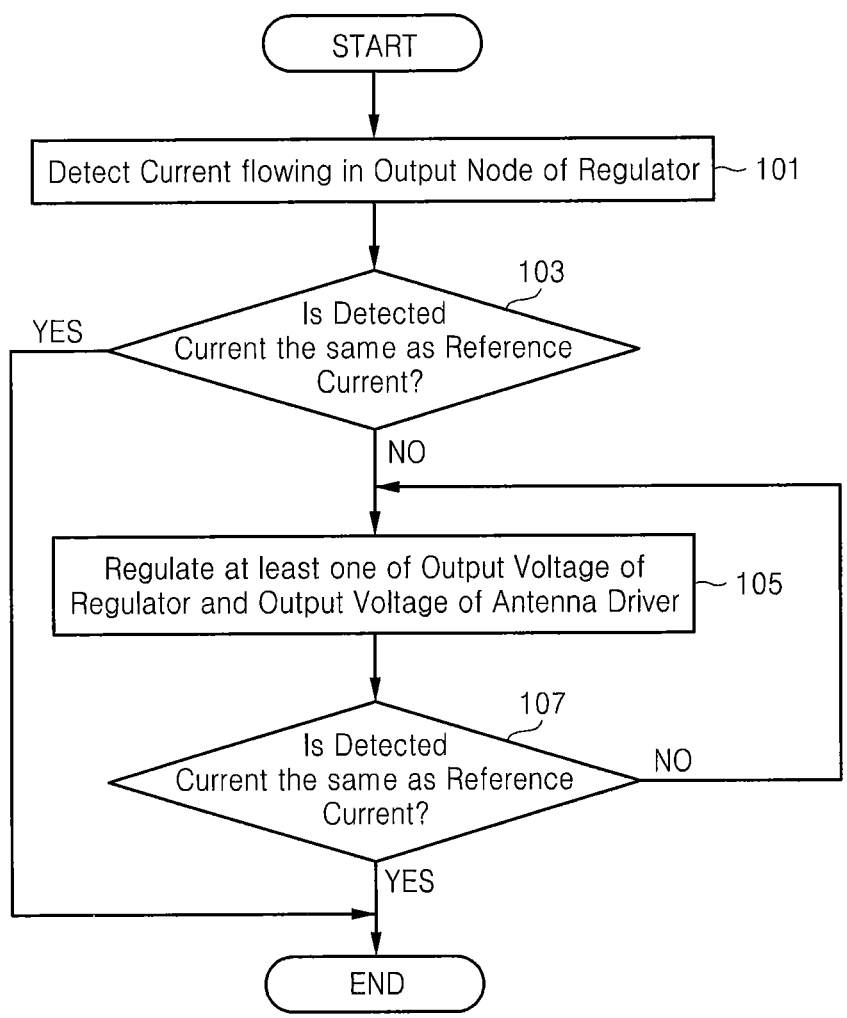
FIG. 6 is a flowchart illustrating a method of operating the transmitter illustrated in FIG. 2.

FIG. 6 is a flowchart illustrating a method of operating the transmitter of FIG. 2. Referring to FIGS. 2 and 6, the current detector 230 of the transmitter 200 may detect the second current I2 that is related to the first current I1 that flows into the output node N1 of the regulator 210 and generate the current detection signal CDS (101).

The control block 250 of the transmitter 200 may compare the current detection signal CDS to a reference current (103), and when the current detection signal CDS is greater or less than the reference current, the control block 250 of the transmitter 200 may output the control signal CS which may regulate the output voltage VN1 of the output node N1 of the regulator 210 and/or the output voltage ADO of the antenna driver 270 (105).

When the output voltage VN1 and/or the output voltage ADO are regulated, the current detector 230 may detect the second current I2 that is related to the first current I1 flowing in the output node N1 of the regulator 210 again, and the control block 250 may compare the current detection signal CDS to the reference current (107). As discussed above, the current detection signal CDS may be related in a known fashion to the current I1 that flows through the output node of the regulator 211. When the current detection signal CDS and the reference current are the same as each other, the transmitter 200 does not regulate the output voltage VN1 and/or the output voltage ADO.

However, when the current detection signal CDS is greater than or less than the reference current, the transmitter 200 may increase or decrease at least one of the output voltage VN1 of the regulator 210 and the output voltage ADO of the antenna driver 270. That is, the transmitter 200 may increase or decrease at least one of the output voltage VN1 of the regulator 210 and the output voltage ADO of the antenna driver 270 based on an output current I1 of the regulator 210 in real time.

A near field wireless communication device according to an example embodiment of the present inventive concepts may detect a current flowing in an output node of a regulator that is included in a transmitter of the near field wireless communication device, and control a voltage of the output node based on the result of the detection. Accordingly, the near field wireless communication device may exhibit reduced power consumption.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A transmitter for a near field communication (NFC) device, comprising:
   a current detector that is configured to detect a first current that flows into an output node of a regulator and to output a current detection signal that is proportional to the detected first current;
   an antenna driver which controls an output voltage output to an antenna in response to a control signal,
   a control circuit which is configured to compare the current detection signal to a reference current and to output the control signal to a voltage control circuit and the antenna driver based on the comparison; and
   wherein the regulator includes:
   a feedback voltage generator which is configured to receive the first current and to generate the feedback voltage, and
   a voltage control circuit which is configured to control a voltage of the output node in response to the control signal that is received from the control circuit.

2. The transmitter of claim 1, wherein the regulator further includes:
   a comparator that is configured to compare a reference voltage to a feedback voltage and to output a comparison signal; and
   a first current generator which is configured to generate the first current in response to the comparison signal.

3. The transmitter of claim 2, wherein the current detector includes a second current generator which is configured to generate a second current by mirroring the first current.

4. The transmitter of claim 3, wherein the current detection signal is proportional to the second current.

5. The transmitter of claim 3, wherein the first current generator is a first MOS transistor and the second current generator is a second MOS transistor.

6. A portable electronic device comprising:
   a near field communication (NFC) chip which includes an antenna, a transmitter that drives the antenna and a controller that is configured to control operation of the transmitter; and
   an application processor that is configured to control an operation of the NFC chip,
   wherein the transmitter includes:
   a current detector that is configured to detect a first current that flows into an output node of a regulator and to output a current detection signal in response to the detected first current;
   an antenna driver which controls an output voltage output to the antenna in response to a control signal; and
   a control circuit which is configured to compare the current detection signal to a reference current and to output the control signal to a voltage control circuit and the antenna driver based on a result of the comparison,
   wherein the regulator includes:
   a feedback voltage generator which is configured to receive the first current and to generate the feedback voltage; and a voltage control circuit which is configured to control a voltage of the output node in response to a control signal that is received from the control circuit.

7. The portable electronic device of claim 6, wherein the regulator further includes:
 a comparator which is configured to compare a reference voltage to a feedback voltage and to output a comparison signal; and
 a first current generator which is configured to generate the first current in response to the comparison signal.

8. The portable electronic device of claim 7, wherein the current detector includes a second current generator which is configured to generate a second current by mirroring the first current.

9. The portable electronic device of claim 8, wherein the current detection signal is related to the second current.

10. The portable electronic device of claim 6, wherein the NFC chip further includes an antenna driver which is configured to control an output voltage that is output to the antenna in response to the control signal.

11. A transmitter for a near field communication device, comprising:
 a regulator that is configured to deliver an output current to an output node;
 a mirror circuit that is configured to generate a current detection signal having a known relationship to the output current; and
 a control circuit that is configured to output a control signal to a voltage control circuit for controlling a voltage of the output node and to an antenna driver for controlling a voltage that is output to the antenna based on the current detection signal.

12. The transmitter of claim 11, wherein the control circuit is configured to generate a control signal that controls both the voltage control circuit black that sets a voltage of the output node and an antenna driver that controls the voltage that is output to the antenna.

13. The transmitter of claim 12, wherein the control circuit is configured to generate the control signal based on a comparison of the current detection signal to a reference current.

14. The transmitter of claim 13, wherein the reference current is based on a value of an externally programmable control register.

15. The transmitter of claim 11, wherein the current detection signal comprises a portion of a mirror current generated by the mirror circuit that substantially mirrors the output current of the regulator.

* * * * *